United States Patent [19]

Venus, Jr.

[11] Patent Number: 4,693,675

[45] Date of Patent: Sep. 15, 1987

[54] NON-THROTTLING DISCHARGE PUMP

[75] Inventor: Frank Venus, Jr., Merrimack, N.H.

[73] Assignee: The Pharmasol Corporation, South Easton, Mass.

[21] Appl. No.: 819,529

[22] Filed: Jan. 16, 1986

[51] Int. Cl.[4] .............................................. G01F 11/06

[52] U.S. Cl. .................................... 417/489; 222/321; 222/385

[58] Field of Search ....................... 222/321, 383, 385; 417/489

[56] References Cited

U.S. PATENT DOCUMENTS 4,034,900 7/1977 Hafele ................................ 222/321

4,325,500 4/1982 Shay ................................ 222/385 X 4,503,996 3/1985 Sorm et al. ...................... 222/385 X 4,607,765 8/1986 Ruscitti .............................. 222/321

*Primary Examiner*—Carlton R. Croyle

*Assistant Examiner*—Theodore Olds

*Attorney, Agent, or Firm*—Robert T. Gammons

[57] ABSTRACT

A discharge pump for expelling fluid from a container comprising a pump chamber, aligned plungers disposed in said pump chamber movable in reciprocation therein and in unison and relative to each other to alternately trap a charge of fluid therebetween, isolate the trapped charge from the container and discharge the trapped charge from the container.

8 Claims, 10 Drawing Figures

NON-THROTTLING DISCHARGE PUMP

BACKGROUND OF THE INVENTION

The two types of finger actuated pumps currently in use are the "throttling" and "non-throttling" systems. Both consist of a valve body housing a plunger acting against a return spring and both also utilize a check valve in the suction and discharge ports. The basic difference between the two is in the method of opening the discharge valve. The "throttling" type generally utilizes a free floating ball while the "non-throttling" type has a spring loaded valve; the spring usually being the same one that returns the plunger to the inactive position.

The terms "throttling" and "non-throttling" describe the control the user has over the discharge. In the "throttling" type, once the system has been primed, flow commences immediately from the dispenser spout as the button is depressed since the discharge check valve offers no resistance to the opening pressure. The user can control the pressure, rate of flow and amount discharged by varying the speed, force and deflection of the activator button; hence, the term "throttling". In the "non-throttling" version, the user must exert enough finger pressure to raise the internal pressure sufficiently high in order to overcome the spring force holding the discharge valve closed. Once this force is exceeded, the discharge valve opens and allows product to flow out into the dispenser spout at a pressure equal to that in the valve housing. As soon as the pressure drops, as, for example, the user stops the downward force on the dispenser spout or the plunger reaches the end of its stroke, the spring loaded discharge valve snaps shut, cutting off any further flow. The advantage of this system over the first is that flow occurs only at a certain minimum pressure and is primarily used for products that must be atomized, such as hair sprays and the like where high pressures and fast shut off are required.

The invention described herein was developed primarily for use with products requiring atomization and designed to overcome the deficiencies inherent in present so-called "non-throttling" pumpsby dividing the input of the user and the output of the valve into two separate yet mutually dependent motions.

SUMMARY OF THE INVENTION

In accordance with the invention as herein illustrated, the discharge pump for expelling fluid from the container comprises a housing dimensioned to be received in the neck of the container and to be sealed therein, said housing defining a pump chamber closed at one end and open at the other end, a first plunger disposed in said pump chamber for reciprocal movement therein, a second plunger disposed in said housing for reciprocal movement therein relative to said first plunger, said first plunger defining a discharge passage, a sealing member covering said discharge passage in one position of said first plunger, said second plunger defining in one position an intake passage from the container into said pump chamber, a sealing member covering in one position of the second plunger said intake passage from the container into said pump chamber, spring means yieldably holding said first and second plungers in said one position such that said discharge passage is covered and said intake passage is uncovered, said plungers being operable by displacement in one direction to successively cover said intake passage and uncover said discharge passage and said spring means being operable when said discharge passage is uncovered to move said second plunger in a direction to discharge fluid through said discharge passage in said first plunger. Desirably, the pump chamber is comprised of axially-aligned first and second chambers in communication with each other at their adjacent ends and said first plunger is supported in said first chamber for reciprocal movement therein and said second plunger is disposed in said second chamber for reciprocal movement therein. The first and second plungers are movable in unison and relative to each other. The first plunger defines the discharge passage and the first sealing member is mounted to said first plunger so as to normally cover said discharge passage in one position of said first plunger. The second plunger defines the intake passage from said second chamber into said first chamber in one position thereof and the second sealing member carried by said second plunger in one position of said second plunger uncovers said intake passage. Spring means yieldably hold said first and second plungers in said one position such that said first sealing member is in said covering position and said second sealing member is in said uncovering position so that the contents of the container is in communication by way of said second chamber with said first chamber. The first plunger is manually movable in a direction to displace said second plunger in a direction to successively move said second sealing member to its covering position and said first sealing member to is uncovering position and to compress said spring means and said spring means is operable upon uncovering of said discharge passage to successively move said second plunger relative to said first plunger to discharge fluid through said discharge passage and thereafter to move said first plunger to a position to restore said first sealing member to its covering position and to move said second sealing member to its uncovering position.

The invention will now be described with reference to the accompanying drawings, wherein.

Figure 1:
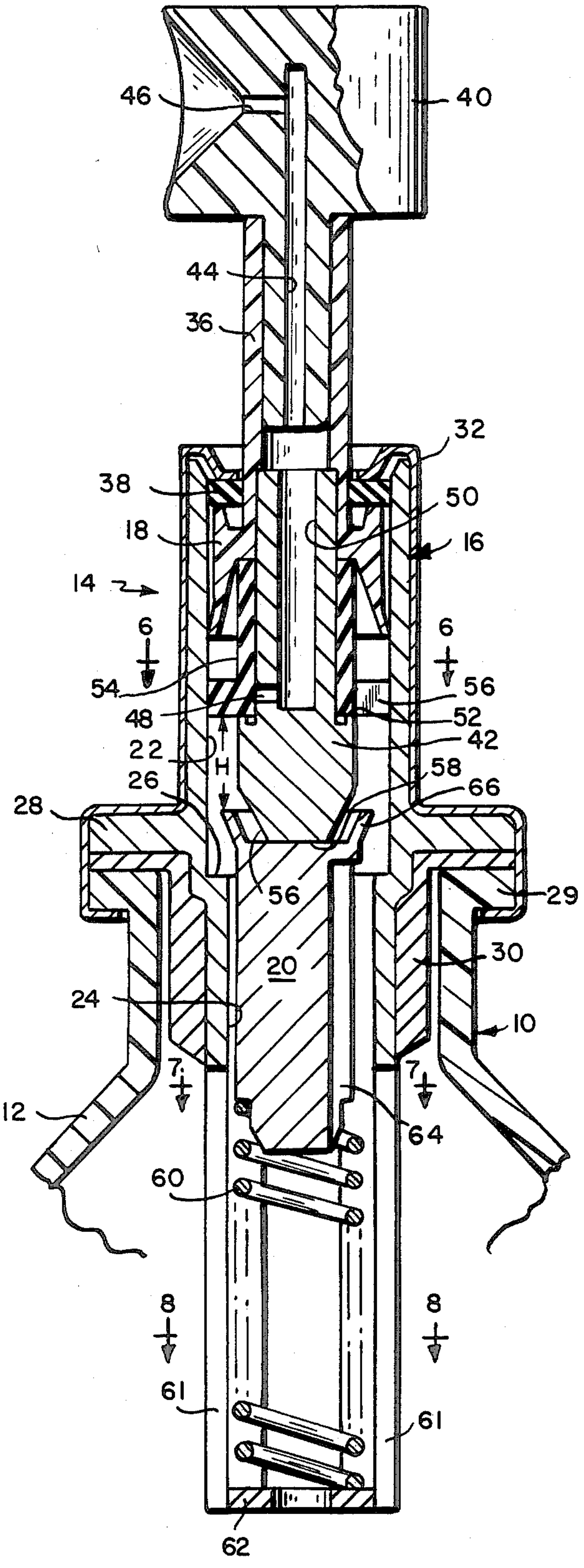
FIG. 1 is a diametral section of the discharge pump of this invention positioned in the open upper end of the neck of a container from which fluid is to be expelled.
Figure 2:
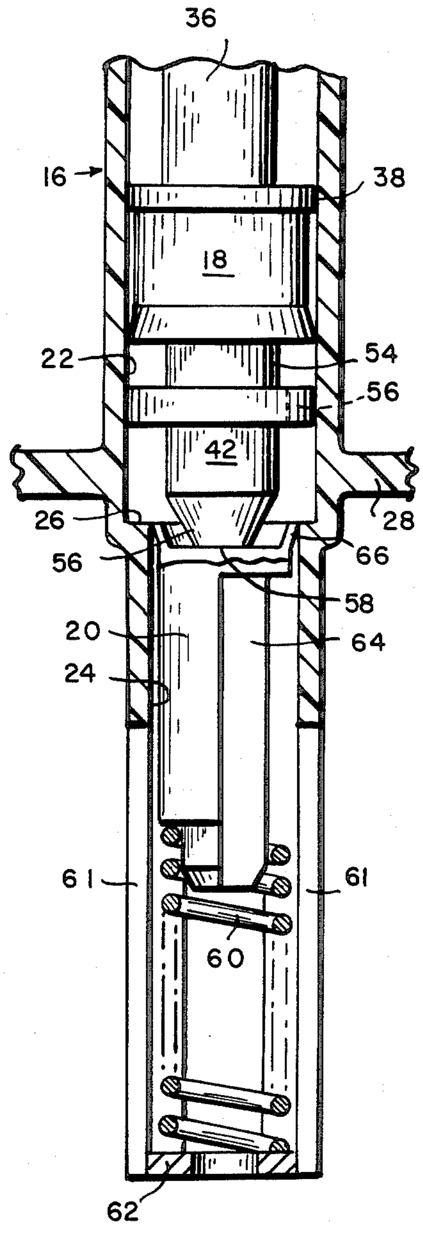
FIG. 2 is a fragmentary section of the pump assembly showing the component parts in a position wherein a predetermined volume of fluid is trapped in the discharge chamber cut off from the container.

Referring to the drawings, FIG. 1, there is shown the neck 10 of a container 12 from which fluid is to be expelled in a predetermined volume of a discharge pump 14 positioned within the neck of the container with a portion extending exteriorly of the container and a portion within the container.

The discharge pump 14 comprises a housing 16, FIG. 1, within which there are mounted primary and secondary plungers 18 and 20 disposed in alignment within first and second chambers 22 and 24, the first chamber 22 being of larger diameter than the second chamber 24 such that there is an annular shoulder 26 at the junction of the two chambers. The housing 16 is provided intermediate its opposite ends with an external, peripheral, radially extending flange 28 corresponding in diameter to the diameter of the flange 29 at the upper end of the neck 10 and is secured to the flange 29 at the upper end of the neck 10 with a sealing gasket 30 therebetween by a cap 32.

Figure 9:
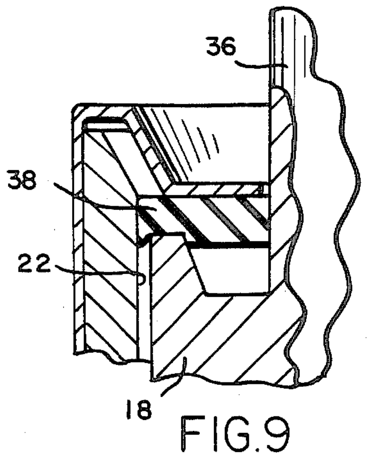
FIG. 9 is a partial section wherein a dip tube is employed.

The primary plunger 18 is mounted in the chamber 22 for reciprocal movement therein and is provided with a hollow stem 36 which extends upwardly through the upper end of the chamber and cap 32. A seal element 38, FIGS. 1 and 9, is disposed about the stem between the plunger and the cap. A spray tip 40 is fixed in the upper end of the hollow stem and a pilot 42 is fixed in the lower end of the hollow stem. The spray tip 40 is provided with a discharge passage 44 and a discharge orifice 46 and the pilot is provided with a discharge passage 48 and a discharge passage 50. The pilot 42 is provided with a shoulder 52 situated beyond the discharge passage 48 and a sealing member 54 is disposed about the pilot between the plunger 18 and the shoulder in a position to normally cover the discharge passage. The sealing member 54 is displaceable on the pilot to uncover the passage 48 and hence, to provide communication between the chamber 22 and the orifice 46 by way of the passages 48, 50 and 44. The sealing member 54 contains a notch 56 providing communication between the portions of the chamber above and below the sealing element. The leading end of the pilot 42 is tapered and has a flat end face 58.

Figure 7:
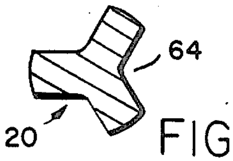
FIG. 7 is a section taken on the line 7—7 of FIG. 1.
Figure 8:
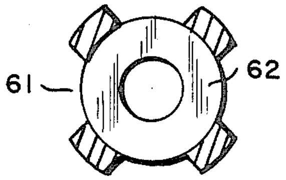
FIG. 8 is a section taken on the line 8—8 of FIG. 1.

The secondary plunger 20 is reciprocally mounted in the chamber 24 and is normally yieldably held in engagement with the flat end face 58 of the primary plunger 18 by a coiled spring 60 disposed within the housing 16 with one end engaged with the lower end of the secondary plunger 20 and the other end engaged with a plug 62 fixed to the lower end of the housing which, as shown in FIG. 8, contains longitudinal slots 61 which provide communication between the housing and the interior of the container. The plunger 20 has longitudinally-extending, peripherally-spaced grooves 64, FIG. 7, which define, in conjunction with the interior of the chamber 24, passages in communication at one end with the interior of the container by way of the slots 61 and at times in communication at the other end with the chamber 22. At the end adjacent the pilot 42, the plunger 20 has a peripherally-disposed yieldable flange 66 structured to provide a seal between the plunger 20 and the interior of the chamber 22 when the plunger 20 is displaced by axial movement of the plunger 18 for the purpose of effecting discharge to provide, by engagement of the flange 66 with the interior of the chamber 24, a seal between the interior of the container and the chamber 22.

Figure 3:
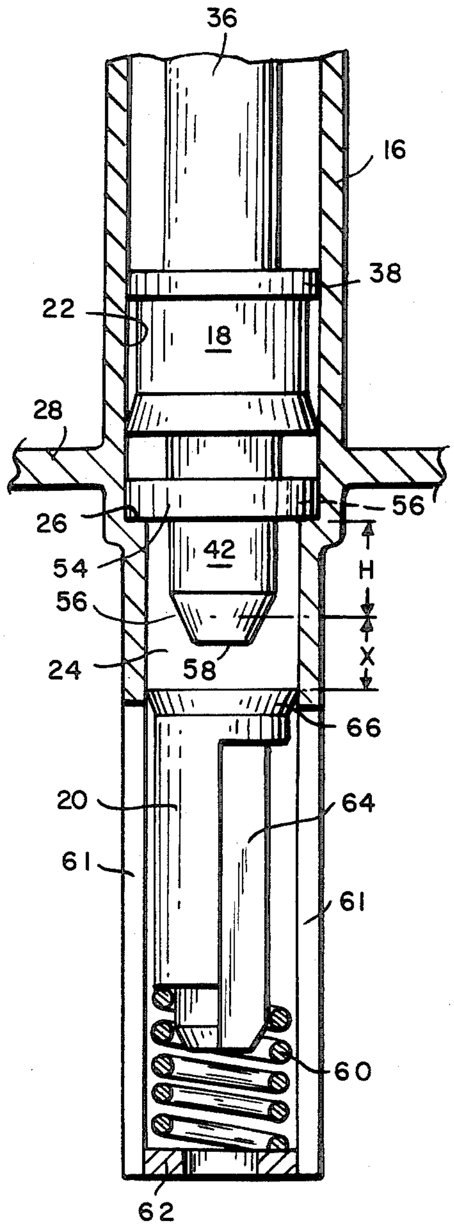
FIG. 3 is a section similar to FIG. 2 wherein the components parts are displaced in an intermediate position wherein pressure is applied to the trapped charge.
Figure 4:
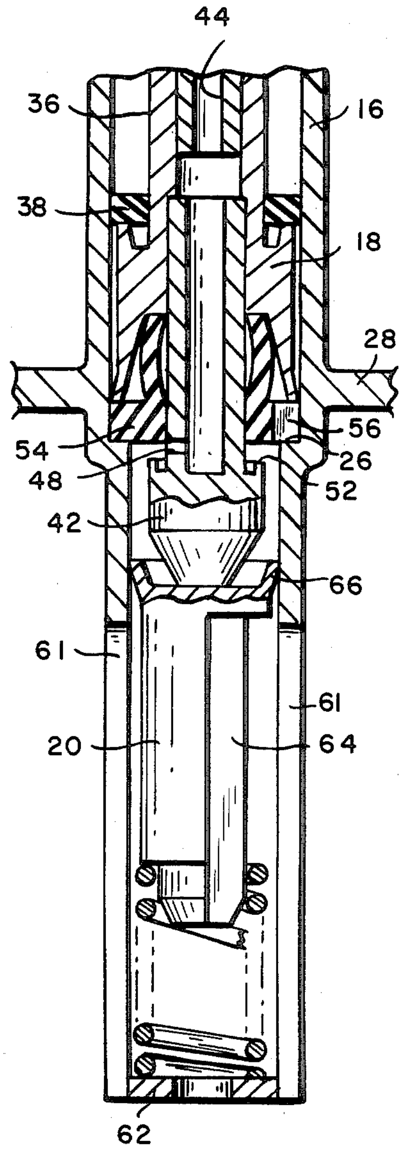
FIG. 4 is a section showing the position of the component parts at the ends of discharge.
Figure 5:
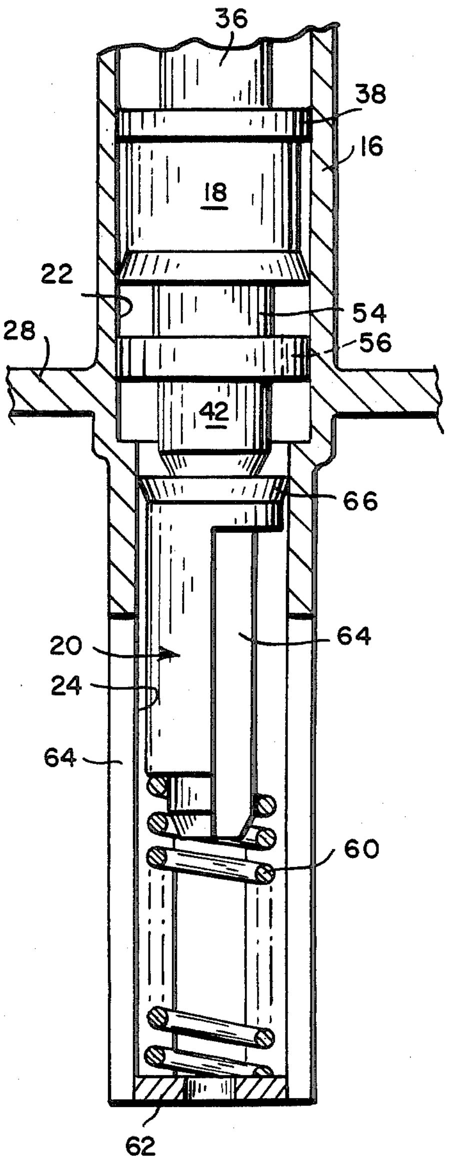
FIG. 5 is a section showing the component parts partially restored to their initial position.
Figure 6:
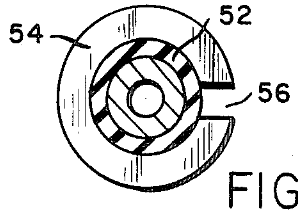
FIG. 6 is a section taken on the line 6—6 of FIG. 1.

As thus structured, discharge from the container 12 is effected by holding the container 12 in a position such that the spray tip 40 is disposed below the container in an inverted position opposite to that which is illustrated in the figures. In this inverted position, the spring pressure afforded by the spring 60 yieldably holds the plunger 20 with its upper end protruding into the chamber 22 in abutting engagement with the lower end of the pilot 42 in a position such that the upper ends of the grooves 64 are in communication with the chamber 22. In this position, fluid in the container 12 gravitates through the grooves 64 into the chamber 22. Held in this inverted position, the entire interior of the pump chamber is loaded with fluid from the container. Discharge is effected by manually applying force to the spray tip 40 in a direction to move the plunger 18 in an inward direction with respect to the interior of the container. Inward movement of the plunger 18 effects by way of the pilot 42 movement of the plunger 20 in a direction to engage the flange 66 with the wall of the chamber 24 to thus close the grooves 64 and, hence, isolate the interior of the container from the chamber 22 so that the fluid in the chamber 22 is trapped between the plungers 18 and 20. Further movement displaces the plunger 20 in opposition to the spring 60. Since the plunger 18 is of larger area then the plunger 20, the plunger 20 is moved at a faster rate than the plunger 18 and, hence, relative to the plunger 18 as shown in FIG. 3, thus further compressing the spring 60. When the plunger 18 reaches a position that the sealing member 54 engages the shoulder 26, FIG. 4, and is displaced relative to the discharge passage 48 so as to uncover the passage 48, fluid within the chamber 24 will be discharged by the spring-pressed plunger 20 from the chamber 24 through the passages 42, 40 and 44 and from thence through the discharge orifice 46 in the spray tip 40. Following discharge, the spring will return the entire assembly to its initial position, thus closing off the discharge passages and reopening the intake passages 64 which connect the chamber 22 to the chamber 24 and, hence, gravitational filling of the chambers from the container.

Figure 10:
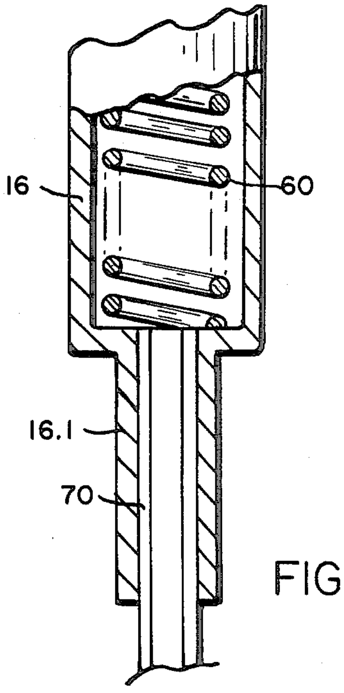
FIG. 10 is a fragmentary section showing the upper sealing gasket.

As hereinbefore described, the structure is designed for introducing the fluid from the container into the chambers gravitationally, the structure being held with the container 12 uppermost and the spray tip 48 below. The structure may, however, be used in an upright position, that is, with the spray tip 48 situated above the container and, when disposed in this position, the lower part of the housing 16, FIG. 10, is provided with an extension 16.1 within which there is mounted a dip tube 70 which extends into the container. In other respects, the structure is identical with that described above.

To recapitulate, in actual use, the unit is inverted before pressing the spray tip 40. The purpose of this is to fill the chambers prior to activation of the valve. By inverting the pump as herein disclosed and providing channels to allow the free gravitational flow of product directly into the chambers, priming is not a problem and the unit will discharge a full dose on the first stroke.

A herein illustrated, in operation, product flows from the interior of the container 12 into the lower end of the chamber by way of the slots 61 and through the passages 64 in the plunger 20, filling the entire interior of the housing. As the plunger 18 is forced into the chamber 22 by finger pressure applied to the spray tip 40, the plunger 20 is forced to travel in the same direction and at the same velocity due to the direct contact between the end of the pilot 42 with the end of the plunger 20. Product is also forced to flow in the same direction due to the sealing action of the sealing member 54 within the chamber 22.

When the sealing member 54 engages the shoulder 26, it seals off the space below and product can no longer flow past the flange 66 into the container. Because of the difference in diameters between the plunger 18 and the plunger 20, further motion of the plunger 18 will cause the plunger 20 to move at a faster rate than the plunger 18 so as to be displaced relative to the plunger 20. Because the volume of liquid trapped between the plunger 18 and the plunger 20 remains constant, the additional distance that the plunger 20 travels as indicated at X in FIG. 3 of the drawings can be readily calculated.

The further movement of the plunger 18 brings the sealing member 54 into contact with the shoulder 26, causing the latter to buckle and to be displaced relative to the passage 42 to thus expose the passage 42. When the passage 42 is uncovered, the spring 60 will move the plunger 20 a distance X into engagement with the pilot, thus discharging product from the chamber 24 through the discharge passages 48, 50 and 44. Further movement will disengage the sealing member 54 from the shoulder 26, allowing the sealing member to recover the discharge passage 42 and, hence, terminate discharge.

There are a number of advantages of this invention over the "non-throttling" pumps now in use. The user cannot control the discharge by "jogging" the actuator 48 since the pump will discharge only when the passage 42 is exposed. Also, it is virtually impossible for the user to stop the flow once it commences since the discharge is almost instantaneous. Furthermore, since the pressure and rate of discharge are independent of the plunger 18 and dependent only on the spring characteristics; the discharge rate, pressure and resultant degree of atomization are constant.

Although the invention is intended primarily for inverted use, it can be used upright by eliminating the feed grooves 61 in the lower end of the housing 16 and adding a tail piece 16.1 and dip tube 70 as shown in FIG. 10. The tail piece 16.1 can be added as shown or extended inward of the housing to reduce overall length of housing. When used in the upright mode, priming is required. The priming action would be similar to that of a "throttling" pump as the compressed air can escape without impediment through the exposed passage, obviating the lifting of a spring-loaded check valve.

Another advantage of the invention is that the unit can be used with a vented container where air is drawn in to replace the discharged product, in a pressurized system or in a total vacuum. In the vented container, the unit must of necessity be used in the upright position only. In the inverted mode, the product flows into the pump housing through gravitational forces only and is completely independent of any pressure or lack of pressure in the container.

For pressurized units, the sealing gasket 38, FIG. 10, provides for reducing the loss of the pressurized gases by permeation through the large exposed area of the plunger 18 while the unit is in the static position. To reduce the added frictional forces of the usual fixed gasket, the upper gasket 38 is shown as free floating and in tight sealing engagement with the inner wall of the pump housing 16 only in the static condition as shown in FIG. 10.

It should be understood that the present disclosure is for the purpose of illustration only and includes all modifications or improvements which fall within the scope of the appended claims.

What is claimed is:

1. A discharge pump for expelling fluid from a container comprising a housing defining aligned large diameter and smaller diameter chambers wherein the adjacent ends of the chambers define an annular shoulder, first and second plungers disposed, respectively, in said large and smaller diameter chambers for reciprocal movement in unison and for movement relative to each other, spring means engaged with said second plunger in said smaller chamber yieldably holding said second plunger extended from said smaller chamber into abutting engagement with said first plunger in said larger chamber, said first plunger being of larger cross section than the second plunger, a discharge passage in said first plunger, sealing means mounted to said first plunger over said discharge passage, an intake passage in said second plunger providing communication between said container and said larger diameter chamber when said second plunger is held extended from said smaller diameter chamber into said larger diameter chamber, sealing means at the end of said second plunger engaged with said first plunger operable when said second plunger is displaced from said larger diameter chamber into said smaller diameter chamber to close the intake passage from the smaller diameter chamber into the larger diameter chamber and said first plunger and sealing means associated therewith being normally movable following movement of said sealing means mounted to said second plunger to close the intake passage to, in succession, displace said second plunger relative to said first plunger and thereafter move said first sealing means associated with the first plunger by engagement with said shoulder relative to said discharge passage to uncover the same and said spring means being operable thereafter to successively move said second plunger from said smaller chamber into said larger chamber and disengage said sealing means associated with the first plunger from said shoulder such as to allow said sealing means associated with the first plunger to cover said discharge passage.

2. A discharge pump for expelling fluid from a container comprising a housing dimensioned to be received within a container and to be sealed therein, said housing defining axially-aligned first and second cylindrical chambers of different diameter, said first chamber being of larger diameter than said second chamber such that there is an annular shoulder at the junction of the chambers, a first plunger supported in the first chamber for reciprocal movement therein, a second plunger supported in the second chamber for reciprocal movement therein, said first and second plungers being movable in unison and relative to each other, said first plunger embodying a stem extending from the first chamber containing an axial passage defining a discharge passage, a collar disposed about said first plunger within the first chamber defining an abutment, a deformable sleeve disposed about said first plunger within the first chamber covering the discharge passage in one position of the first plunger, a second plunger disposed in the second chamber, said second plunger defining an intake passage from said second chamber into said first chamber in one position of the second plunger, a second sealing member disposed about the second plunger in said one position of said second plunger uncovering said intake passage and in another position sealing the intake passage, spring means yieldably holding said first and second plungers in said one position such that said first sealing member is in said covering position and said second sealing member is in said uncovered position so that the contents of the container is in communication by way of the intake passage with the first chamber and wherein said first plunger is manually movable in a direction to displace the second plunger in a direction to successively move the second sealing member to its covering position, move the first sealing member into engagement with the shoulder to seal the first chamber from the second chamber, move the collar relative to the sleeve to apply sealing pressure to the sleeve and move the first plunger relative to the sleeve to dispose the discharge passage in said first plunger and in said second chamber of smaller diameter between the sleeve and the second sealing member to thus raise the pressure of the fluid therein and to compress said spring means to apply ejection pressure to the fluid trapped in the second chamber and said spring means being operable upon movement of the first and second sealing members to their initial position following discharge to return said first sealing member to its covering position and said sealing member to its uncovering position.

3. Apparatus according to claim 2 wherein said collar corresponds in diameter to the inside diameter of the first chamber and provides a bearing circumferentially of the first plunger between the first plunger and the chamber.

4. Apparatus according to claim 2 wherein said sleeve embodies an annular sealing shoulder corresponding in diameter to the inside diameter of the first chamber and wherein said annular shoulder contains a radial opening providing communication between the portions of the chamber above and below the shoulder.

5. Apparatus according to claim 2 wherein the second sealing member is disposed about the end of the second plunger adjacent the end of the first plunger.

6. A discharge pump according to claim 2 wherein said first plunger is provided with an actuating stem protruding from said housing operable to effect displacement of said first plunger.

7. A discharge pump according to claim 6 wherein an actuating stem is provided with a spray tip containing a discharge orifice in communication with said discharge passage.

8. A discharge pump according to claim 2 wherein said second plunger is in the form of a piston disposed in said second chamber containing axially-extending, peripherally-spaced radial grooves.

* * * * *